United States Patent
Paz et al.

(10) Patent No.: US 9,398,440 B2
(45) Date of Patent: Jul. 19, 2016

(54) APPARATUS AND METHOD FOR INTERFACING WITH A CELL-PHONE NETWORK

(75) Inventors: Ofir Paz, Rishon LeZion (IL); Yoav Netzer, Ra'anana (IL); Yossi Dagan, Ra'anana (IL); Erez Doron, Tel Aviv (IL)

(73) Assignee: CELL BUDDY NETWORK LTD., Tel Aviv (IL)

( * ) Notice: Subject to any disclaimer, the term of this patent is extended or adjusted under 35 U.S.C. 154(b) by 406 days.

(21) Appl. No.: 13/704,617

(22) PCT Filed: Jun. 16, 2011

(86) PCT No.: PCT/IB2011/052630
§ 371 (c)(1),
(2), (4) Date: Dec. 16, 2012

(87) PCT Pub. No.: WO2011/158207
PCT Pub. Date: Dec. 22, 2011

(65) Prior Publication Data
US 2013/0095797 A1    Apr. 18, 2013

Related U.S. Application Data

(60) Provisional application No. 61/355,171, filed on Jun. 16, 2010.

(51) Int. Cl.
*H04W 12/06*   (2009.01)
*H04W 8/18*   (2009.01)
(Continued)

(52) U.S. Cl.
CPC ........... *H04W 8/18* (2013.01); *H04L 29/12905* (2013.01); *H04L 61/6054* (2013.01); *H04L 63/0853* (2013.01); *H04W 12/06* (2013.01)

(58) Field of Classification Search
CPC ...... H04W 12/06; H04W 8/18; H04L 63/0853
USPC ......................................................... 455/411
See application file for complete search history.

(56) References Cited

U.S. PATENT DOCUMENTS 6,466,804 B1 * 10/2002 Pecen et al. .................. 455/558
7,274,950 B2 * 9/2007 Castrogiovanni et al. .... 455/558
(Continued)

FOREIGN PATENT DOCUMENTS

EP    1239687    9/2002
EP    1850607    10/2007
(Continued)

OTHER PUBLICATIONS

International Search Report mailed Sep. 23, 2011 for PCT/IB2011/052630, International filing date Jun. 16, 2011.
(Continued)

*Primary Examiner* — Nathan Mitchell
(74) *Attorney, Agent, or Firm* — A.C. Entis-IP Ltd.

(57) ABSTRACT

A smart card for use with a mobile communication device adapted to communicate over a cell-phone network, the smart card comprising: at least one communication port for communicating with a transceiver via a communication channel that is not a cell-phone channel; and a processor configured to receive from the transceiver an IMSI from a SIM having an authentication key, and an authentication response generated by the SIM responsive to the SIM's authentication key and a challenge by a cell-phone network, and to transmit the received IMSI and authentication response to the mobile communication device for transmission to the cell-phone network via a cell-phone communication channel provided by the cell-phone network.

21 Claims, 6 Drawing Sheets

(51) Int. Cl.
*H04L 29/06* (2006.01)
*H04L 29/12* (2006.01)

(56) References Cited

U.S. PATENT DOCUMENTS

| | | | |
|---|---|---|---|
| 2002/0085511 A1* | 7/2002 | Koponen et al. | 370/315 |
| 2003/0211840 A1* | 11/2003 | Castrogiovanni et al. | 455/405 |
| 2004/0204087 A1* | 10/2004 | Carlsson | 455/558 |
| 2004/0204089 A1* | 10/2004 | Castrogiovanni et al. | 455/558 |
| 2006/0172772 A1* | 8/2006 | Bjorkner | 455/558 |
| 2008/0081611 A1* | 4/2008 | Hoyt et al. | 455/425 |
| 2009/0006848 A1* | 1/2009 | Adrangi et al. | 713/168 |
| 2009/0163175 A1* | 6/2009 | Shi et al. | 455/411 |
| 2009/0191918 A1* | 7/2009 | Mardiks | 455/558 |
| 2010/0062808 A1* | 3/2010 | Cha et al. | 455/558 |
| 2010/0210304 A1* | 8/2010 | Huslak | 455/558 |
| 2010/0273424 A1* | 10/2010 | De Petris et al. | 455/41.2 |
| 2010/0311468 A1* | 12/2010 | Shi et al. | 455/558 |

FOREIGN PATENT DOCUMENTS

| | | |
|---|---|---|
| WO | 2006056220 | 6/2006 |
| WO | 2009092115 | 7/2009 |

OTHER PUBLICATIONS

Chinese Office Action dated Jan. 6, 2015 for corresponding Chinese application No. 2008800364924.

\* cited by examiner

APPARATUS AND METHOD FOR INTERFACING WITH A CELL-PHONE NETWORK

RELATED APPLICATIONS

The present application is a US National Phase of PCT Application No. PCT/IB2011/052630, filed on Jun. 16, 2011, which claims the benefit under 35 U.S.C. §119(e) of U.S. Provisional Application 61/355,171 filed on Jun. 16, 2010 the disclosure of which is incorporated herein by reference.

TECHNICAL FIELD

Embodiments of the invention relate to apparatus and methods of communication over a cell-phone network.

BACKGROUND

A modern cell-phone communication network established and maintained by a cell-phone network service provider, conventionally referred to as an "operator", typically provides full duplex, wireless communication services in a geographically localized service area between mobile communication devices. The devices operate under a contract with the operator, which permits their use of the network's services. The communication devices, referred to in the industry as mobile equipment (ME), appear in their most common format as the globally ubiquitous cell-phones, but may also appear as, or be comprised in, any of various other devices, such as a laptop, or personal digital assistant (PDA). For convenience of presentation, mobile equipment, ME, in any of its forms is generically referred to also as a cell-phone. An operator under contract to provide cell-phone communication services to a cell-phone is referred to as the cell-phone's, or cell-phone owner's, "home operator".

Each cell-phone network is assigned a limited number of frequency channels over which to transmit and receive radio signals, and to provide for efficient use of the channels, the network's service area, is divided into contiguous communication regions referred to as cells. Each cell has a base transceiver station (e.g. BTS or Node-B) comprising antenna for transmitting and receiving radio signals to and from subscriber cell-phones and a transceiver for receiving and forwarding voice and/or data signals from and to subscriber cell-phones. The BTS also comprises a controller for processing and routing calls and performing network management tasks.

To reduce electromagnetic interference between communications in the network cells, adjacent cells in the network use different subsets of the network's assigned frequency channels, and subscriber phones and transceivers in the networks BTSs, normally transmit at relatively low power. As a result, a given BTS can efficiently transmit to, and receive signals from, cell-phones that are located only within a limited range from the BTS location. The range defines a size of the cell to which the BTS belongs. A cell-phone network service area may often cover a geographical area the size of a city and be divided up into tens of cells. In densely populated areas, BTSs in a cell-phone network may be spaced between 2 km-5 km (kilometers) apart, and between as little as a few dozen meters apart.

In order to provide continuous communication service for a subscriber cell-phone, the network's BTSs and the cell-phones communicate with each other over a set of control communication channels to continuously keep track of where in the service area the cell-phone is located. When the cell-phone "roams" from a first cell to a second cell in the network's service area, the network transfers the tasks of providing and maintaining communication services to the cell-phone from the BTS in the first cell to the BTS in the second cell. By appropriately coordinating transfer of responsibility for communication between cells, the cell-phone network is able to route calls substantially at any time to a given subscriber cell-phone anywhere in the network's service area, and maintain continuous communication to the cell-phone while the cell-phone physically moves from one network cell to another.

A subscriber's roaming is of course not limited to local, "home" roaming between cells within the geographically limited service area of a cell-phone network of the subscriber's home operator. Cell-phone network operators from different regions in a same country cooperate to provide "national roaming" from anywhere in the country and cell-phone network operators from different countries cooperate to provide global roaming. A subscriber of a given home operator may therefore typically use his or her cell-phone not only from a location within the service area of the home operator's network, but from substantially any location on the globe to communicate with a cell-phone anywhere else on the globe.

In order to provide satisfactory tracking of cell-phone locations, "hand-over" of communication responsibilities from cell to cell in a same cell-phone network, or between cells in different cell-phone networks, and billing for provided mobile telephony services, each cell-phone generally comprises a smart card, referred to as a subscriber identity module (generally referred to as a SIM or USIM). Hereinafter, a SIM or USIM may be referred to as a SIM or SIM card. The SIM is generally removably seated in a cradle in the phone, and is stored with a unique international mobile subscriber identity (IMSI) code that identifies the SIM. The SIM also comprises a typically 128 bit identity authentication key "KI". The KI is generally not accessible from the SIM but is used by the SIM to generate responses to identity authentication challenges presented to the cell-phone by a cell-phone network.

In order to access services from a cell-phone network, the cell-phone must generally present its SIM card IMSI to the network. Following recognition of the IMSI, the cell-phone and network engage in an authentication procedure to authenticate the IMSI. In the procedure, the network challenges the cell-phone by sending it data, typically a random number, which the cell-phone's SIM processes using its KI to generate a response. The cell-phone transmits the response to the network, and if the response is what the network expects, it allows the cell-phone access to its services. In addition to circuit switched data (CSD) voice communication, the services may comprise, other CSD services e.g. Fax, signaling services e.g. short message services (SMS), and transmission and reception of packet switched (PS) data e.g. for Internet and Intranet access, directory access, file transfer and Instant messaging (IM).

Generally, once identified and authenticated by its home operator cell-phone network to which it is subscribed, barring aberrant events such as unforeseen disruption of services or security challenges, a cell-phone may roam its home network without further requirement of authentication. If however, the cell-phone roams from its home operator's network to a cell of a cell-phone network of another operator, it becomes a "visitor" to the other "visited operator". The visited operator's network typically demands that the visitor identify itself by presenting its IMSI and authenticate its identity by generating a response to an authentication challenge. The visited operator transmits the visitor's IMSI and authentication challenge response to the visitor's home operator for validation. If validated, the visited operator allows the visitor to use its communication services.

Services provided to a cell-phone subscriber by cell-phone operators can be expensive and costs can rise substantially, and prohibitively, if a cell-phone roams to a visited operator and uses the services of the visited operator's cell-phone network—especially if the visited operator is a foreign operator. To control costs, a cell-phone user often purchases a plurality of different SIM cards, each associated with a different home operator and/or service package. When the user moves to different locations and/or uses different cell-phone services, the user chooses a SIM card intended to provide advantageous pricing for communication services that the user intends to use, and inserts it in to his or her cell-phone.

SUMMARY

An aspect of an embodiment of the invention, relates to providing an interface system for interfacing a cell-phone with a cell-phone network. The interface system enables the cell-phone to selectively assume any one of a plurality of "alias" SIM identities for presentation to a cell-phone network to access services provided by the network. The alias identity comprises an IMSI and an authentication response generated responsive to an authentication key, KI, associated with the IMSI.

The interface system includes a SIM server having a library comprising a plurality of SIMs. The cell-phone comprises a smart card, hereinafter referred to as a "proxy-SIM", configured to communicate with the SIM server via a transceiver to acquire an identity of a SIM comprised in the SIM server for use as an alias for presentation to a cell-phone network by the cell-phone. Communication between the proxy-SIM and the transceiver is via a non cell-phone channel. Optionally, the non cell-phone channel comprises a wireless radio channel. In some embodiments of the invention, the non cell-phone channel comprises a wire channel. In some embodiments of the invention, both the transceiver and proxy-SIM are comprised in the cell-phone. Optionally, communication between the transceiver and the SIM server is performed via a cell-phone channel.

In an embodiment of the invention, to acquire an alias for presentation to the cell-phone network, the proxy-SIM transmits a request for an alias identity to the SIM server via the transceiver. The request includes call data that, optionally, comprises a location of the proxy-SIM's cell-phone and/or data relevant to establishing a cell-phone communication channel between the cell-phone and a called device. Call data relevant to establishing the channel may include a location of a BTS communicating with the cell-phone, and/or local time, and/or cell-phone networks and/or operators that are available to service the cell-phone. The SIM server determines if it has an alias SIM identity for the proxy-SIM responsive to the call data that provides advantageous pricing for services to be accessed by the cell-phone. If it has such a SIM identity, and it is available for "lending" to the proxy-SIM, the SIM server transmits the alias to the transceiver for forwarding to the proxy-SIM.

In an embodiment of the invention, an interface system comprises a plurality of SIM servers that may be accessed by a proxy-SIM, and if a given SIM server cannot provide a suitable alias, the proxy-SIM is configured to request an alias from another of the SIM servers.

There is therefore provided in accordance with an embodiment of the invention, a smart card for use with a mobile communication device adapted to communicate over a cell-phone network, the smart card comprising: at least one communication port for communicating with a transceiver via a communication channel that is not a cell-phone channel; and a processor configured to receive from the transceiver an IMSI from a SIM having an authentication key, and an authentication response generated by the SIM responsive to the SIM's authentication key and a challenge by a cell-phone network, and to transmit the received IMSI and authentication response to the mobile communication device for transmission to the cell-phone network via a cell-phone communication channel provided by the cell-phone network.

Optionally the smart card comprises a memory that stores the IMSI. Alternatively or additionally, the transceiver is comprised in the smart card. In an embodiment of the invention, the transceiver is comprised in a cell-phone.

In an embodiment of the invention, the non cell-phone channel comprises a wire channel. In an embodiment of the invention, the non cell-phone channel comprises a wireless channel. Optionally, the wireless channel comprises a WiFi channel. In an embodiment of the invention, the wireless channel comprises a Bluetooth channel.

There is further provided in accordance with an embodiment of the invention, a system for communicating via a cell-phone network, the system comprising: a mobile communication device comprising a smart card in accordance with an embodiment of the invention; a transceiver that communicates with the smart card via a non cell-phone channel; a server that communicates with the transceiver and comprises: a plurality of SIMs, each comprising an IMSI and an authentication key; a processor configured to select, a SIM of the plurality of SIMs, responsive to call data received from the transceiver and to provide to the transceiver an IMSI and an authentication response provided by the selected SIM responsive to its authentication key and a challenge from a cell-phone network; wherein, the transceiver transmits the IMSI and authentication response to the smart card for transmission by the communication device to the cell-phone network.

Optionally, the transceiver communicates with the SIM server via a cell-phone channel. Additionally or alternatively the transceiver communicates with the SIM server via a WIMAX channel.

In an embodiment of the invention, the mobile communication device is associated with a particular SIM accessed by a particular phone number for communication via the cell-phone network, and the SIM server comprises a communication device that receives calls sent to the particular phone number and forwards the received calls to the smart card.

In an embodiment of the invention, the mobile communication device is associated with a particular SIM accessed by a particular phone number for communication via the cell-phone network, and the SIM server comprises a communication device different from the mobile communication device that the cell-phone network identifies with the particular SIM.

There is further provided in accordance with an embodiment of the invention, a cell-phone network comprising a system for communicating via a cell-phone network in accordance with an embodiment of the invention.

There is further provided in accordance with an embodiment of the invention, a method of enabling access of a mobile communication device to services provided by a cell-phone network, the method comprising: providing an IMSI to the mobile communication device via the cell-phone network for transmission to the cell-phone network; and providing a response to an authentication challenge transmitted by the cell-phone network to the mobile communication device via the cell-phone network for transmission to the cell-phone network.

Optionally, providing the IMSI comprises using a transceiver that communicates via the cell-phone network. Optionally, the transceiver transmits the IMSI to the mobile communication device via a non cell-phone communication channel. Alternatively or additionally, providing the response comprises using a transceiver that communicates via the cell-phone network. Optionally the transceiver transmits the response to the mobile communication device via a non cell-phone communication channel. In an embodiment of the invention, the non cell-phone communication channel comprises a wireless channel.

In an embodiment of the invention the method comprises choosing a SIM card from a library comprising a plurality of SIM cards to provide the IMSI and response.

In the discussion unless otherwise stated, adjectives such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical structures, elements or parts that appear in more than one figure are generally labeled with a same numeral in all the figures in which they appear. Dimensions of components and features shown in the figures are chosen for convenience and clarity of presentation and are not necessarily shown to scale.

DETAILED DESCRIPTION

Figure 1A:
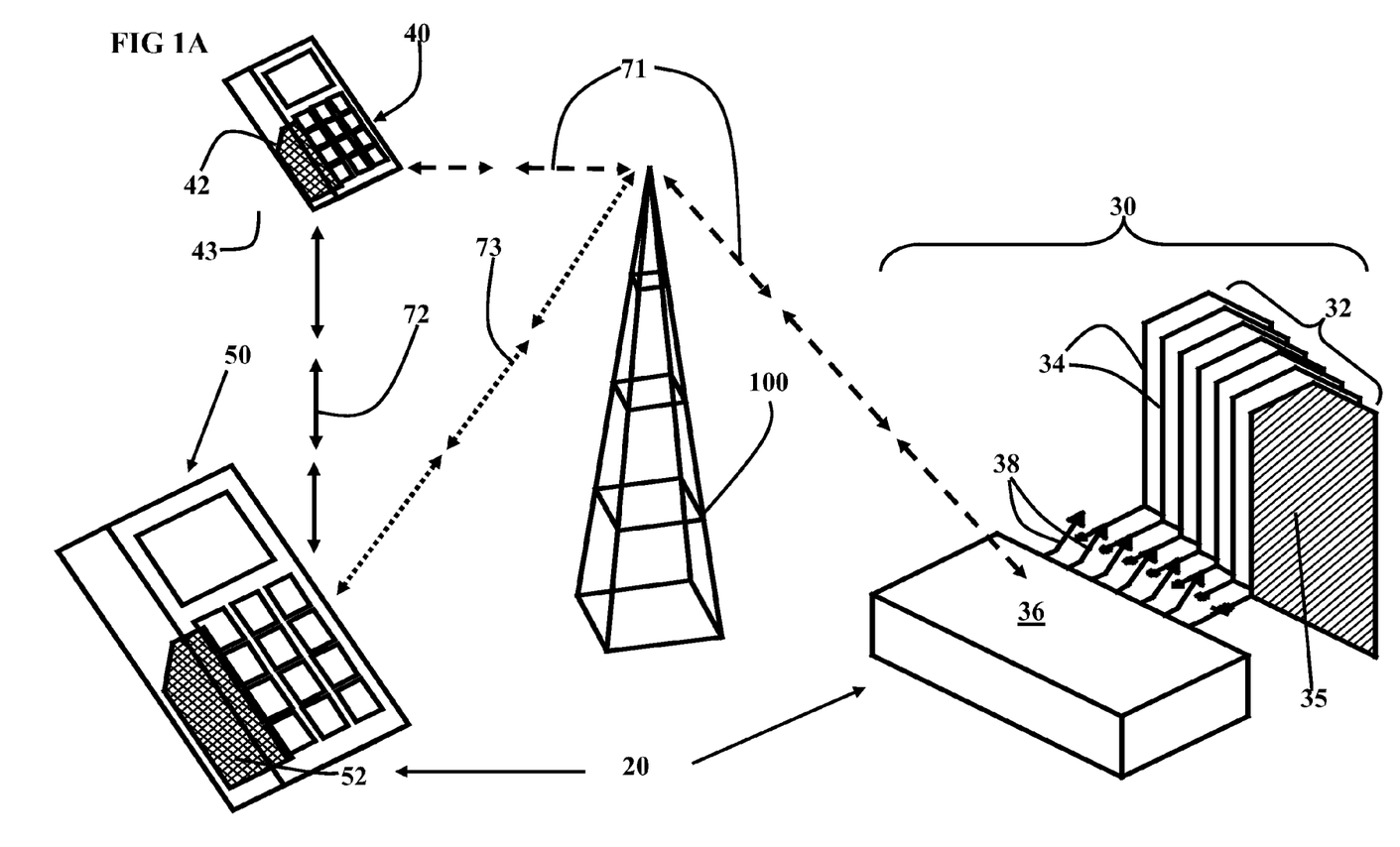
FIG. 1A schematically shows a cell-phone interface system operating to provide an alias SIM identity for use by a cell-phone to access communication services from a cell-phone network, in accordance with an embodiment of the present invention.

FIG. 1A schematically shows a cell-phone interface system 20 operating to provide an alias SIM identity for use by a cell-phone 50 so that it can access communication services from a cell-phone network represented by a tower 100, in accordance with an embodiment of the present invention.

Interface system 20 optionally comprises a proxy-SIM 52 in the format of a SIM card shown mounted in cell-phone 50, a SIM server 30 and a transceiver 40. SIM server 30 comprises a library 32 of SIMs, optionally in the format of SIM cards 34, and a processor 36. Processor 36 is able to select and communicate with any given SIM card of the plurality of SIM cards 34 to retrieve its IMSI, present it with an authentication challenge, and receive a response that the SIM card generates responsive to the authentication challenge. Switches 38 schematically represent the ability of processor 36 to select and communicate with any of SIM cards 34 comprised in library 32. When a switch 38 associated with a given SIM card 34 is closed, it indicates the processor is communicating with the SIM card. Optionally, SIM server 30 is configured to communicate via cell-phone network 100 and comprises a dedicated SIM card (not shown), and/or selects a SIM card 34, for communication via the network. In an embodiment of the invention, processor 36 is configured to receive calls for a first cell-phone number and route the calls to a second cell-phone number, for example to perform call forwarding in a "follow me" procedure.

Optionally, transceiver 40 comprises a SIM card 42 and communicates with SIM server 30 over a cell-phone channel represented by dashed arrows 71 provided by cell-phone network 100. Optionally, as shown in FIG. 1A, the transceiver comprises a cell-phone. SIM card 42 in transceiver 40 and proxy-SIM 52 in cell-phone 50 communicate via a non cell-phone channel represented by solid arrows 72, and the transceiver and cell-phone comprise suitable apparatus (not shown) for establishing and operating the non cell-phone channel. Optionally, channel 72 comprises any of various suitable wireless channels, such as a Bluetooth, a WiFi, an IR, or an ultrasonic acoustic channel. In some embodiments of the invention, channel 72 comprises a wire channel. Proxy-SIM 52 optionally does not have an IMSI and associated KI of its own, and is configured to request an alias SIM identity from SIM server 30 for use by cell-phone 50 to access services provided by a cell-phone network, such as network 100.

Whereas in FIG. 1A and figures that follow transceiver 40 and cell phone 50 are shown as physically separated entities, in some embodiments of the invention, transceiver 40 is comprised in and uses components of cell-phone 50. For example, proxy-SIM 52 may be incorporated with and receive power from a battery that provides power for cell-phone 50, and SIM card 42 may be a SIM card in a SIM card socket in cell-phone 50. Proxy-SIM 52 may be configured having hardware and/or an instruction set to control communication with, access to, and use of components, such as a cell-phone front end, comprised in cell-phone 50 for itself and for SIM card 42.

In an embodiment of the invention, transceiver 40 comprises in addition to SIM card 42 an "original" SIM card 43, referred to as an "OR-SIM" card 43 or "OR-SIM" 43. In FIG. 1A and figures that follow OR-SIM 43 is schematically shown outside of transceiver 40 for convenience of presentation. An OR-SIM is a SIM which a user of cell-phone 50 generally uses in cell-phone 50 when not using proxy-SIM 52, to access services provided by network 100 and, optionally, to store personal data, such as an address book and communication records. The OR-SIM is also assumed to be associated with a cell-phone number recognized as a phone number of the user of phone 50 which is a recognized number regularly used by people for accessing and calling the user. In some embodiments of the invention, an original OR-SIM used with cell-phone 50 performs functions of SIM 42.

In FIG. 1A cell-phone 50 is assumed, by way of example, to be located in a service area of network 100 and to have just been turned on to be registered by the network to access services provided by the network. To acquire a SIM identity, proxy-SIM 52 transmits a request for an alias SIM identity to transceiver 40 via the non cell-phone channel 72 over which it communicates with the transceiver. The request comprises information as to where cell-phone 50 is located and/or a location of a network BTS communicating with the cell-phone, and/or local time, and/or cell-phone networks and/or operators that are available to service cell-phone 50. Transceiver SIM card 42 and a SIM card in SIM server 30 are assumed to be registered by cell-phone network 100, and the transceiver forwards the request for the alias to SIM server 30 via channel 71.

Processor 36 in SIM server 30 processes the request to select a SIM card from the server's library 32 of SIM cards 34 to provide an alias for proxy-SIM 52. Since the request includes information that cell-phone 50 is located in the service area of network 100, it chooses a SIM card, arbitrarily denoted as SIM card 35 and distinguished by shading, from library 32 that provides a lowest charge rate for communication services provided by the network for a cell-phone located in the network's service area. Selection of SIM card 35 is schematically represented in FIG. 1A by closure of switch 38 that is operable to connect processor 36 with the SIM card. Optionally, network 100 is a network of the home operator for SIM card 35.

After choosing SIM card 35, SIM server 30 transmits the SIM card's IMSI to transceiver 40 for use as an alias IMSI by proxy-SIM 32 over cell-phone channel 71 connecting the server and transceiver. The transceiver transmits the alias IMSI it receives to proxy-SIM 52 over non cell-phone channel 72 that connects the transceiver and the proxy-SIM.

When proxy-SIM 52 receives the alias IMSI it presents it to cell-phone 50 for transmission to network 100 over a cell phone channel represented by dotted arrows 73 provided by the network. Upon receipt of the alias IMSI, network 100 challenges the cell-phone to authenticate the alias. Since proxy-SIM 52 does not have an authentication key, KI, associated with the alias IMSI it received from SIM server 30, it cannot on its own provide a valid response to the challenge. It therefore sends a request comprising the challenge for authentication via channels 72 and 71 to SIM server 30.

SIM server, 30 forwards the challenge it receives to SIM card 35. The SIM card processes the challenge responsive to its authentication key KI to generate a response to the challenge. The response is transmitted to proxy-SIM 52 via channels 71 and 72. The proxy-SIM provides the response to cell phone 50, which in turn forwards the response to network 100 over cell phone channel 73. Upon receiving the response, network 100 checks to determine if it is a valid response for the IMSI that it received from the cell phone, and if it is, it registers the cell phone for use of services it provides.

In an embodiment of the invention, once registered, proxy-SIM 52 is configured to perform functions performed by conventional SIM cards. In some embodiments of the invention, proxy-SIM 52 is configured to perform functions performed by conventional SIM cards prior to registration. For example, in an embodiment of the invention proxy-SIM 52 may comprise its own IMSI and KI and be able to function as a conventional SIM card.

Whereas once proxy-SIM 52 is recognized and registered by mobile phone network 100, under the alias IMSI (from SIM 35) it received from SIM server 32, cell-phone 50 can originate and receive calls over the network. However, it will of course not be able to directly receive calls dialed to phone numbers different from the alias phone number under which proxy-SIM 52 is registered with network 100. In particular, if cell-phone 50 was regularly used in network 100 with an original, OR-SIM, having a phone number recognized as a phone number of the phone's user, people calling the recognized phone number would not be connected to the user.

To provide cell-phone 50 with incoming phone calls dialed to the OR-SIM phone number, when cell-phone 50 is registered under its alias with network 100, processor 36 transmits a request to the network to forward calls made to the OR-SIM phone number to a selected forwarding "follow me" phone number. Optionally, the forwarding number is a number of a particular SIM card in processor 36 or in library 32. When a call dialed to the OR-SIM phone number by a calling party is forwarded to the forwarding number, processor 36 calls the alias phone number of proxy-SIM 52 to connect phone 50 to the forwarded call and to the calling party.

It is noted that a forwarding number cannot in general be used to forward SMS messages to phone 50 and proxy-SIM 52 that are sent to the OR-SIM phone number. Forwarding services are generally not available for SMS messages, and SMS messages that are sent to an unavailable, phone are stored by the mobile network in memory for later retrieval when the unavailable phone becomes available. In accordance with an embodiment of the invention, to provide "real time" SMS services to phone 50 that are sent to the OR-SIM number, cell-phone interface system 20 provides an emulation phone for cell-phone 50 discussed below that is associated with, and accessed using the OR-phone number.

Figure 1B:
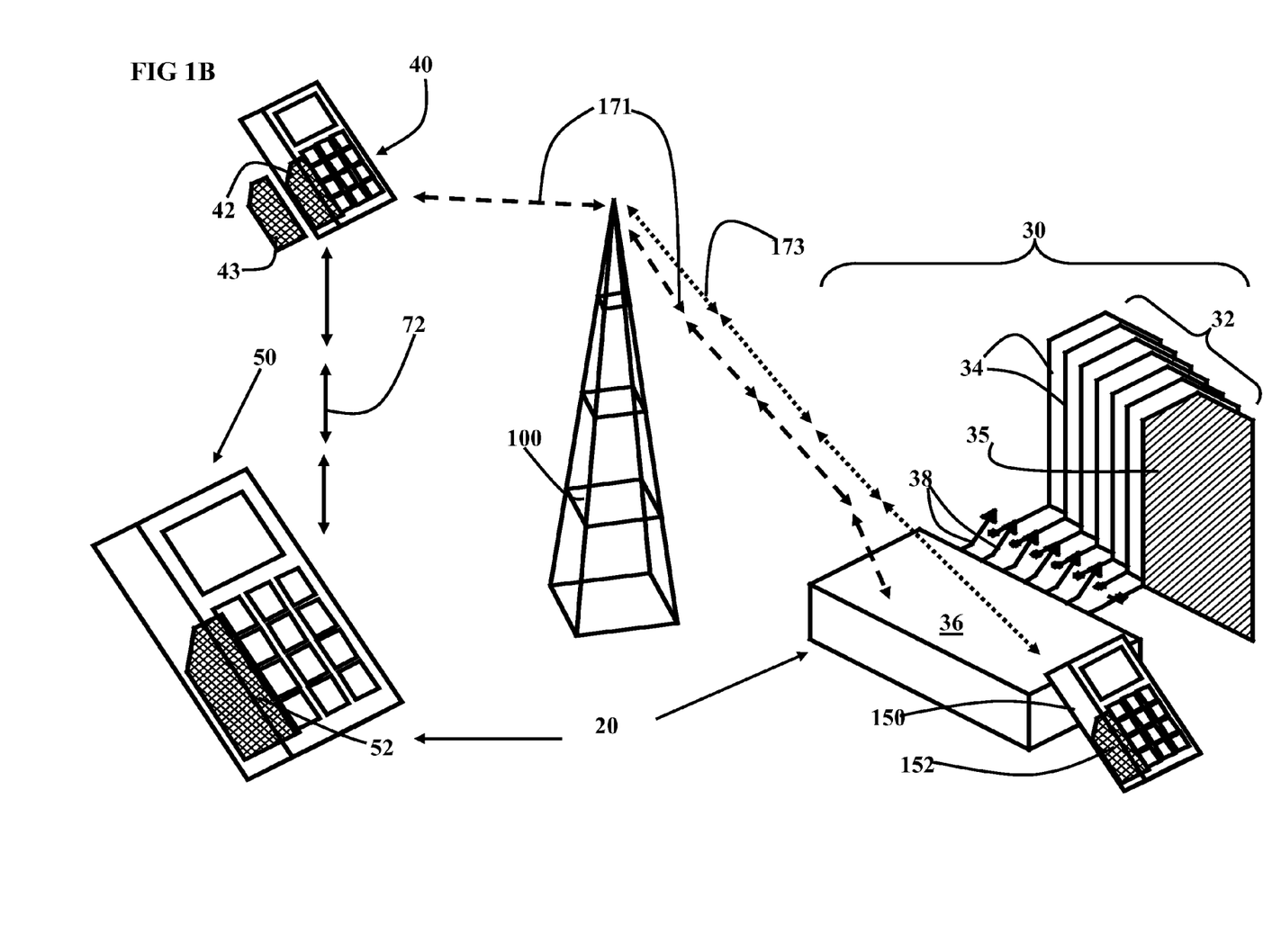
FIG. 1B schematically shows the cell-phone interface system shown in FIG. 1A operating to provide a SIM emulator to support SMS communications for a cell phone provided with an alias SIM identity, in accordance with an embodiment of the present invention.

FIG. 1B schematically shows an emulation phone 150 and illustrates configuring the emulation phone, in accordance with an embodiment of the invention. Emulation phone 150 may be a cell-phone located in the service areas of network 100 comprised in or accessible by processor 36, and comprises an emulation SIM card 152. Emulation SIM 152 is optionally similar to proxy-SIM 52, and is configured to be able to assume an alias in much the same way that proxy-SIM 52 assumes an alias.

After providing proxy-SIM 52 with an alias identity as SIM 35 from library 32, processor 36 optionally transmits a request to transceiver 40 via a cell phone channel schematically represented by dashed arrows 171 to receive the IMSI of OR-SIM 43. When processor 36 receives the IMSI, it provides it to emulation phone 150 and emulation SIM 152. The processor controls emulation phone 150 and its SIM 152 to transmit the OR-IMSI to network 100 to be authorized and registered to use the network. Transmission of the OR-IMSI to network 100 is done via a cell-phone channel schematically represented by dotted arrows 173.

In response to receiving the IMSI, network 100 transmits an authentication challenge optionally over channel 173 to cell-phone 150. The cell phone on its own cannot respond to the challenge because it does not have the KI associated with the IMSI, and communicates the challenge to processor 36. The processor in turn communicates the request to transceiver 40 via cell-phone channel 171. Transceiver 40 acquires a proper response to the authentication challenge from OR-SIM 43 and transmits the response, optionally over channel 171, to processor 36. The processor provides emulation cell-phone 150 with the response and the cell-phone presents the response to network 100, optionally via channel 173 to complete authentication and registration.

After authentication, emulation SIM 152 is registered by network 100 with the identity and phone number of OR-SIM 43, and SMS messages sent to the phone number associated with OR-SIM 43 are received by cell-phone 150. When an SMS message reaches cell-phone 150 it forwards the SMS to processor 36. In an embodiment of the invention, the processor transmits the SMS via network 100 as data over a general packet radio service data channel (GPRS) represented by dashed arrow 171 to transceiver 40, which alerts a user of the cell-phone to arrival of the SMS. Optionally processor 36 transmits the SMS as a standard SMS to proxy-SIM 52 via network 100. An example of transmission and processing of an SMS message to cell-phone 50, in accordance with an embodiment of the invention are described below with reference to FIG. 2D.

It is noted that whereas OR-SIM 43 is shown in FIG. 1A and figures that follow as being comprised in transceiver 40, the OR-SIM does not necessarily have to reside in the transceiver. To provide the information and functions described, it can be located anywhere for which it has communication with processor 36. For example, it may be coupled to a networked computer and communicate with processor 36 via the network over which the computer communicates.

Figure 2A:
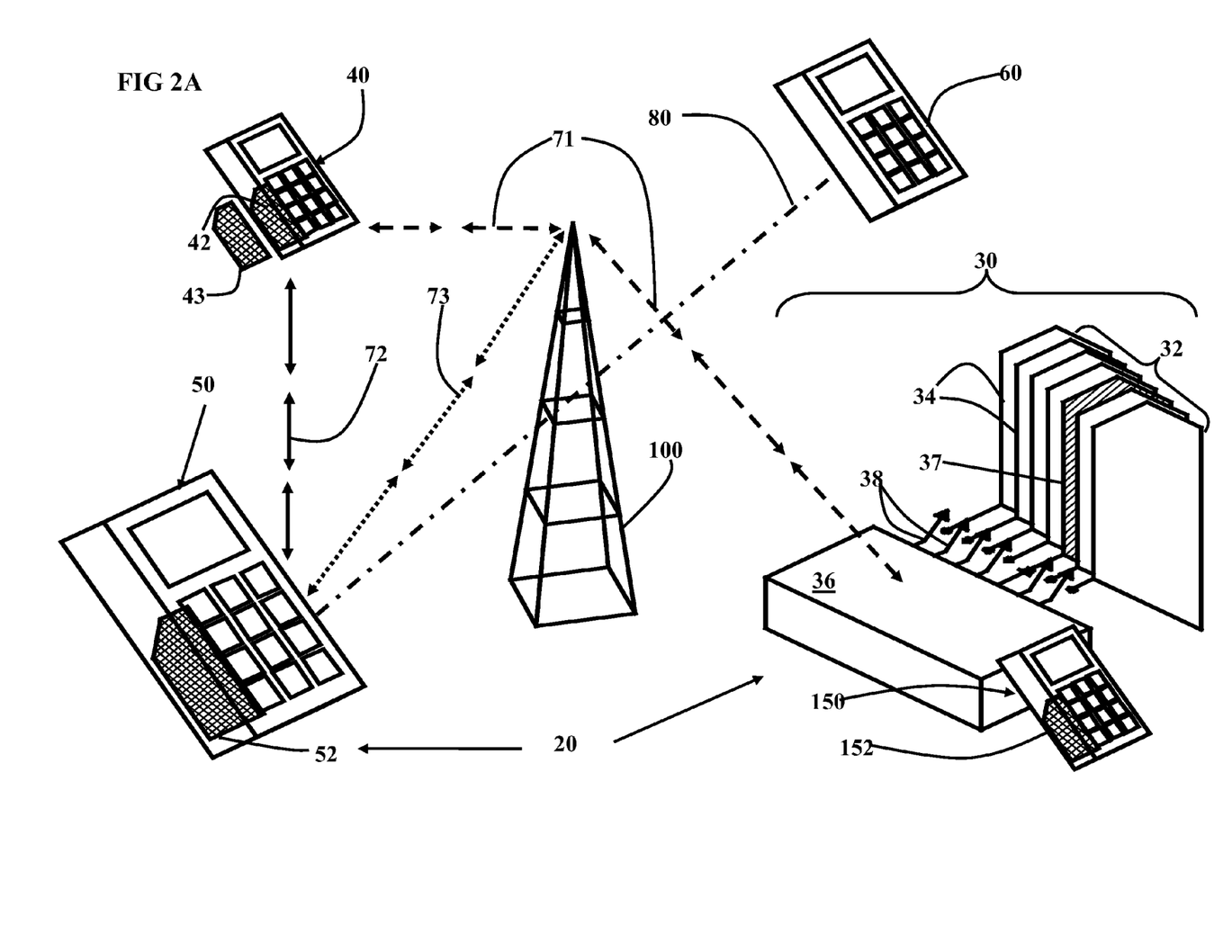
FIGS. 2A and 2B schematically show an example of the cell-phone interface system shown in FIGS. 1A and 1B operating to provide an alias SIM identity for use by a cell-phone to establish a call with a called device, in accordance with an embodiment of the present invention.
Figure 2B:
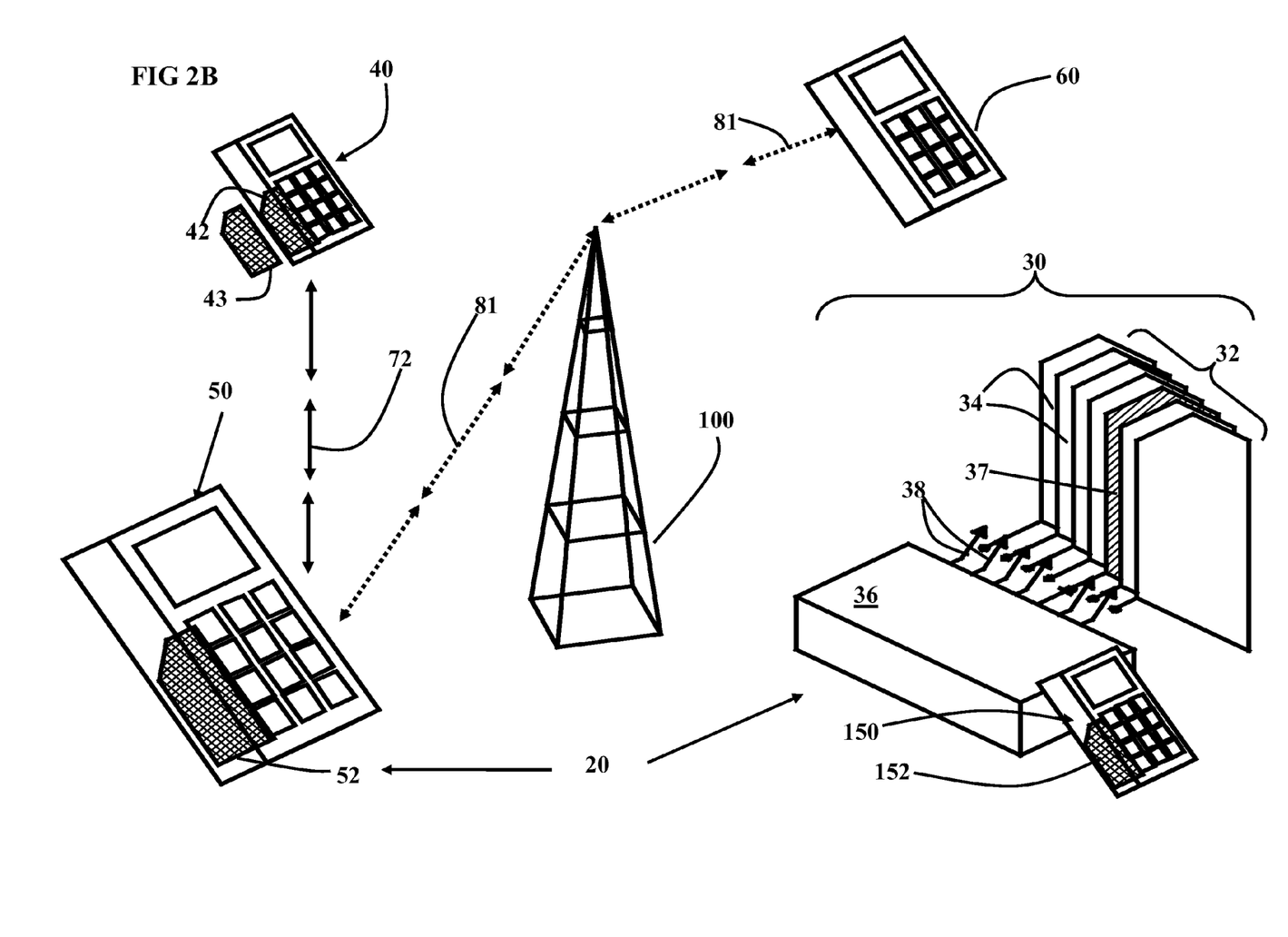

FIGS. 2A and 2B schematically show cell-phone interface system 20 shown in FIG. 1A operating to provide an alias SIM identity for use by cell-phone 50 to establish a call with a called device 60, in accordance with an embodiment of the present invention. Cell-phone 50 is assumed to be registered to use services provided by cell-phone network 100, in accordance with an identification and authorization procedure similar to that described above. Called device 60 is by way of example assumed to be a called device, not necessarily a cell-phone, in a country different from that in which network 100 is located. The intended call, is represented by a dot-dash line 80.

When the user of cell-phone 50 dials a phone number to set up call 80 to device 60, proxy-SIM 52 recognizes that the phone call is to a device that is outside, either geographically or technically, of the service area of network 100. Consequently, in accordance with an embodiment of the invention, proxy-SIM 52 puts the set up of call 80 by network 100 on hold.

Proxy-SIM 52 then transmits a request to SIM server 30 via transceiver 40 and channels 72 and 71 for an alias SIM identity that will provide advantageous cost rates for call 80. The request comprises call data that provides the SIM server with a location of cell-phone 50 and identifies intended call 80. SIM server 30 processes the request data to determine if its library 32 comprises a SIM card 34 that will provide advantageous call rates compared to those that obtain for the alias SIM identity that the proxy is currently using.

By way of example, SIM server 30 determines that it has such a SIM card, and in FIG. 2A the determined advantageous SIM card is arbitrarily shown as shaded SIM card 37. After allocating SIM card 37, SIM server 30 transmits the SIM card's IMSI to proxy-SIM 52 via communication channels 71 and 72. Proxy-SIM 52 then, optionally, abandons its current alias SIM identity, and initiates a registration procedure for the new alias provided by SIM card 37 with cell-phone network 100 to access the networks service with the new alias. The registration sequence for SIM card 37 is similar to that described above with reference to FIG. 1A for SIM card 35.

Upon identification and authentication of the new alias, proxy-SIM 52 releases call 80, which was on hold, and enables cell-phone 50 to access network 100 with the new alias and establish a cell-phone channel with device 60. The established cell-phone channel between cell-phone 50 and device 60 is schematically represented by dotted arrows 81 in FIG. 2B.

Figure 2C:
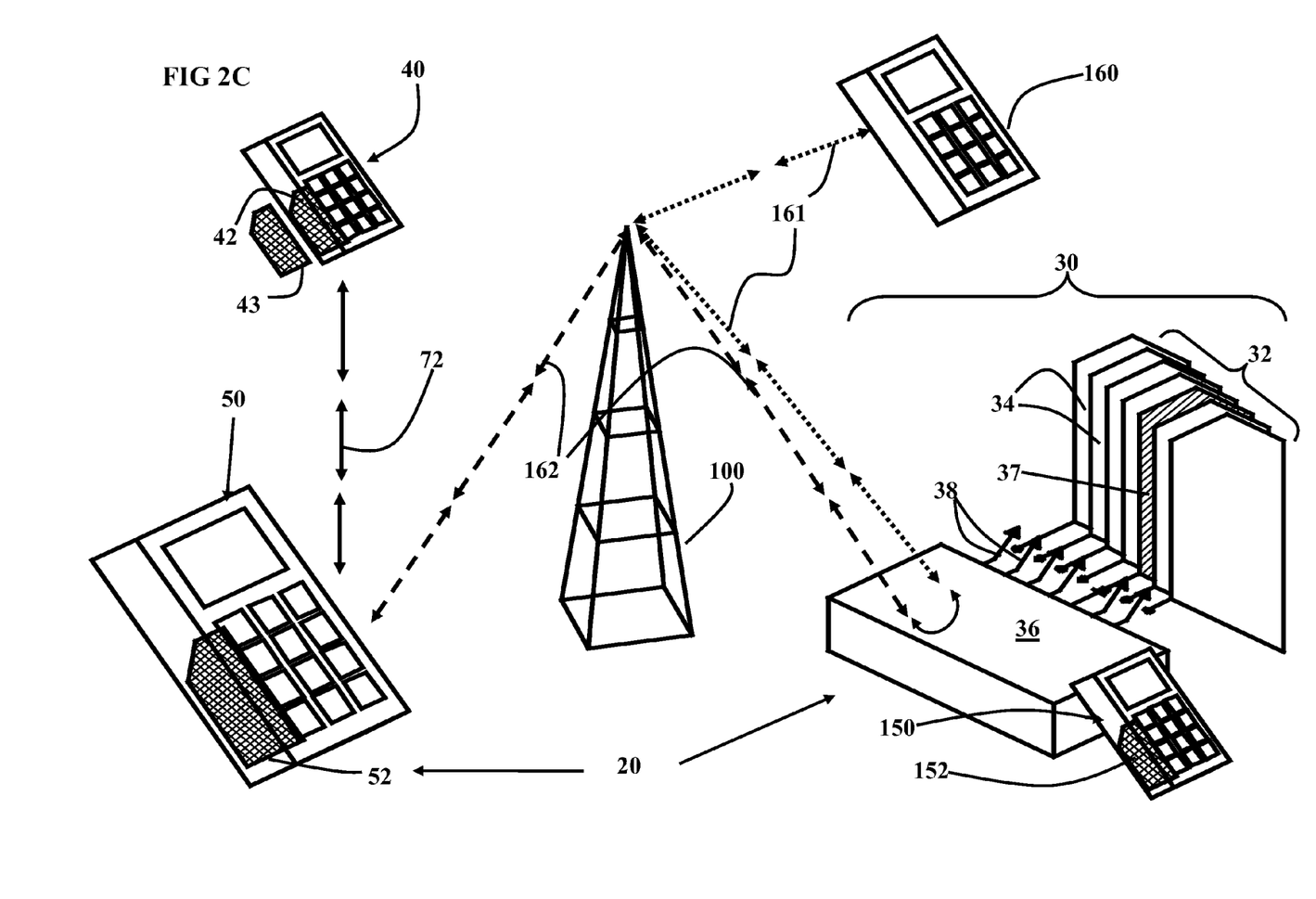
FIG. 2C schematically shows an example of the cell-phone interface system shown in FIGS. 1A and 1B operating to enable a cell-phone having an alias SIM identity to receive a call from a calling device, in accordance with an embodiment of the present invention.

FIG. 2C schematically illustrates a calling device 160 calling a telephone number associated with OR-SIM 43 to call the user of cell-phone 50, in accordance with an embodiment of the invention. The telephone number associated with OR-SIM 43 may for example be a phone number with which the user of cell-phone 50 is usually accessed for a phone call.

As noted above, a call to the OR-SIM number cannot directly reach the user of cell-phone 50 because the user's phone answers to its alias number, and does not answer to the OR-SIM 43 number. However, in accordance with an embodiment of the invention, when SIM card 37 in library 32 was assigned to proxy-SIM 52, processor 36 submitted a request to network 100 to forward all calls to the OR-SIM number to a selected "forwarding" phone number used by processor 36.

Consequently, as schematically shown in FIG. 2C, the call originated by device 160 to the phone number of OR-SIM 43 is forwarded to processor 36 over a cell-phone channel schematically represented by dotted arrows 161. Upon receiving the phone call from device 160, processor 36 forwards the call over a cell-phone channel represented by dashed arrows 162 to cell-phone 50 using the alias phone number associated with SIM card 37 and used by proxy-SIM 52. Channels 161 and 162 establish a cell-phone call channel for the phone call between device 160 and cell-phone 50.

Figure 2D:
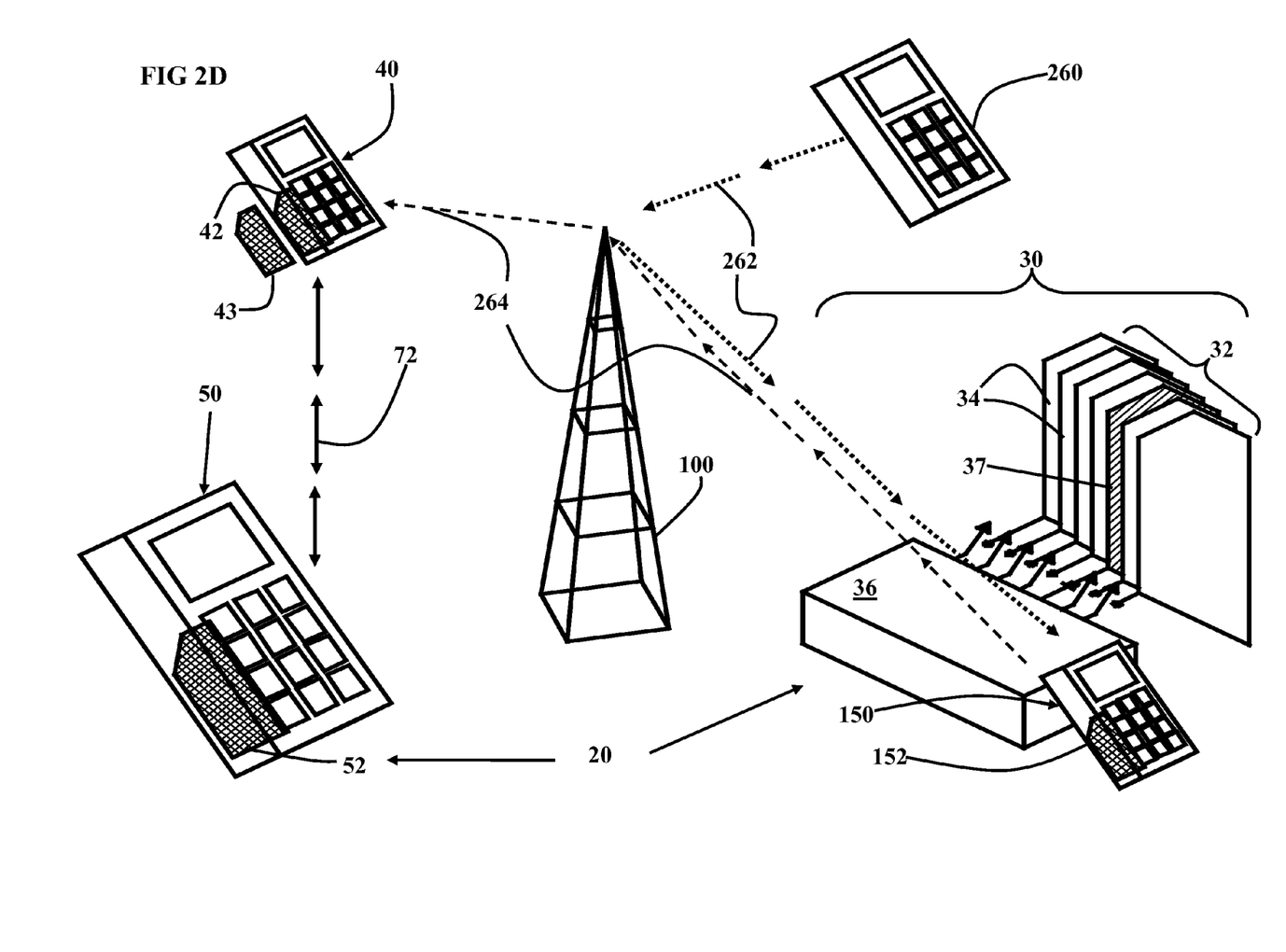
FIG. 2D schematically shows an example of the cell-phone interface system shown in FIGS. 1A and 1B operating to support SMS communication for a cell-phone having an alias SIM identity, in accordance with an embodiment of the present invention.

FIG. 2D schematically illustrates transmitting an SMS to phone 50. In the figure an SMS message is being sent for the phone number associated with OR-SIM 43. It is transmitted as a conventional SMS message over a control channel represented by dotted arrows 262 to emulation phone 150. Processor 36 receives the SMS from emulation phone 150 and processes it for transmission as data over a GPRS channel represented by dashed arrows 264 to transceiver 40. Upon reaching transceiver 40 the transceiver optionally stores the data in OR-SIM 43 and notifies cell-phone 50 via non cell-phone channel 72 of the arrival of an SMS. An SMS may be sent in response to the received SMS via channel 72, 264 and 262 back to cell-phone 260. In an embodiment of the invention, instead of forwarding the SMS to transceiver 40 processor 36 may transmit the SMS directly to cell-phone 50 and proxy-SIM 52.

In the description and claims of the present application, each of the verbs, "comprise", "include" and "have", and conjugates thereof, are used to indicate that the object or objects of the verb are not necessarily a complete listing of components, elements, or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A smart card for use with a mobile communication device adapted to communicate over a cell-phone network, the smart card comprising:
    at least one communication port for communicating with a transceiver via a non cell-phone communication channel; and
    a processor configured to:
        initiate a request for, and receive from the transceiver via the non cell-phone communication channel an IMSI from a SIM having an authentication key and located in a SIM server comprising a plurality of SIMs;

provide the mobile communication device with the IMSI;

request and receive from the transceiver via the non cell-phone communication channel an authentication response generated by the SIM using the SIM's authentication key in response to a challenge that the cell-phone network transmits to the mobile communication device in response to the cell-phone network receiving the IMSI from the mobile communication device; and transmit the authentication response to the mobile communication device for transmission to the cell-phone network via a cell-phone communication channel provided by the cell-phone network, wherein the smart card has a physical format of a SIM card.

2. A smart card according to claim 1 and comprising a memory that stores the IMSI.

3. A smart card according to claim 1 wherein the transceiver is comprised in the smart card.

4. A smart card according to claim 1 wherein the transceiver is comprised in the mobile communication device.

5. A smart card according to claim 1 wherein the non cell-phone channel comprises a wire channel.

6. A smart card according to claim 1 wherein the non cell-phone channel comprises a wireless channel.

7. A smart card according to claim 6 wherein the wireless channel comprises a WiFi channel.

8. A smart card according to claim 6 wherein the wireless channel comprises a Bluetooth channel.

9. A system for communicating via a cell-phone network, the system comprising:
a mobile communication device comprising a smart card in accordance with claim 1;
a transceiver that communicates with the smart card via a non cell-phone channel;
a SIM server that communicates with the transceiver and comprises a plurality of SIMs, each SIM of the plurality of SIMs comprising an IMSI and an authentication key; and
a processor configured to select a SIM of the plurality of SIMs responsive to call data received from the transceiver, and to provide to the transceiver an IMSI and an authentication response provided by the selected SIM, responsive to the selected SIM's authentication key and a challenge from a cell-phone network;
wherein the transceiver transmits the IMSI and authentication response to the smart card for transmission by the communication device to the cell-phone network via a cell-phone communication channel provided by the cell-phone network.

10. A system in accordance with claim 9 wherein the transceiver comprises another SIM and is operable to communicates with the SIM server via another cell-phone communication channel that is established using the other SIM.

11. A system in accordance with claim 9 wherein the transceiver communicates with the SIM server via a WIMAX channel.

12. A system in accordance with claim 9 wherein the mobile communication device is associated with a particular SIM accessed by a particular phone number for communication via the cell-phone network, and the SIM server comprises a communication device that receives calls sent to the particular phone number and forwards the received calls to the smart card.

13. A system in accordance with claim 9 wherein the mobile communication device is associated with a particular SIM accessed by a particular phone number for communication via the cell-phone network, and the SIM server comprises a communication device different from the mobile communication device that the cell-phone network identifies with the particular SIM.

14. A cell-phone network comprising a system for communicating via a cell-phone network in accordance with claim 9.

15. A method of enabling access of a mobile communication device to services provided by a cell-phone network, the method comprising:
configuring the mobile communication device by providing it with a smart card configured to:
initiate a request for an IMSI from a SIM having an authentication key and located in a SIM server comprising a plurality of SIMs; and
initiate request for a response to an authentication challenge associated with the IMSI that is transmitted to the mobile communication device by the cell-phone network; and
providing the IMSI and the response to the mobile communication device via a cell-phone communication channel provided by the cell-phone network.

16. A method according to claim 15 wherein providing the IMSI to the mobile communication device comprises using a transceiver that comprises another SIM and communicates with the SIM server via another cell-phone communication channel.

17. A method according to claim 16 wherein the transceiver transmits the IMSI to the mobile communication device via a non cell-phone communication channel.

18. A method according to claim 15 wherein providing the response to the mobile communication device comprises using a transceiver that comprises another SIM and communicates via another cell-phone communication channel.

19. A method according to claim 18 wherein the transceiver transmits the response to the mobile communication device via a non cell-phone communication channel.

20. A method according to claim 17 wherein the non cell-phone communication channel comprises a wireless channel.

21. A communication system comprising:
a smart card configured to be comprised in and operatively connected to a mobile communication device;
a transceiver comprising a first SIM and operable to communicate with:
the smart card via a non cell-phone communication channel; and
a SIM server via a first cell-phone communication channel established with the first SIM; and
a processor comprised in the smart card, the processor configured to:
initiate a request for and receive, from the SIM server via the transceiver, an IMSI from a second SIM that is selected from a plurality of selectable SIMs comprised in the SIM server;
provide the IMSI of the second SIM to the mobile communication device for transmission to the cell phone network;
request and receive, from the SIM server via the transceiver, an authentication response generated by the second SIM responsive to the selected SIM's authentication key and a challenge that the cell-phone network transmits to the mobile communication device in response to the cell-phone network receiving the IMSI from the mobile communication device; and
provide the authentication response to the mobile communication device for transmission to the cell-phone network in order to establish a second cell-phone communication channel between the mobile communication device and the cell-phone network.

\* \* \* \* \*